(No Model.)
A. MUIRHEAD.
QUADRUPLEX TELEGRAPH.
No. 281,117. Patented July 10, 1883.
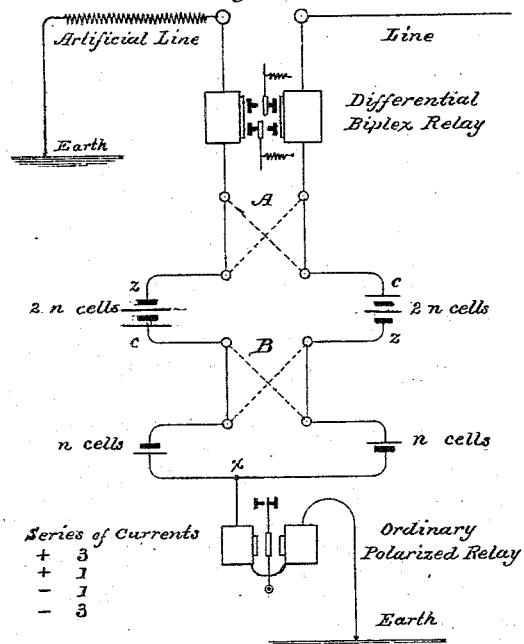
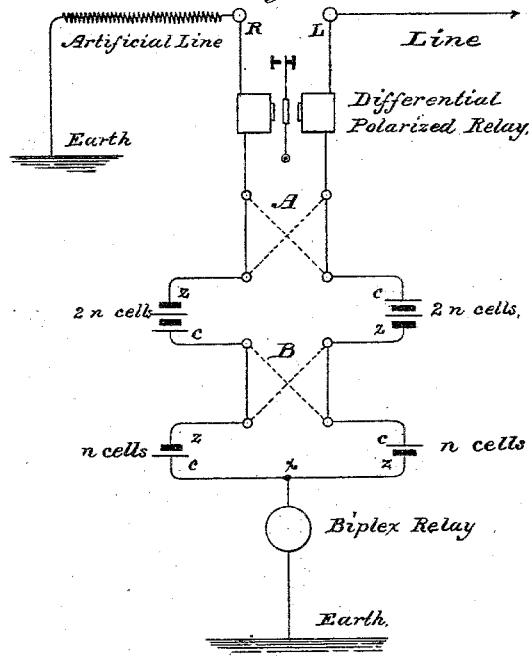
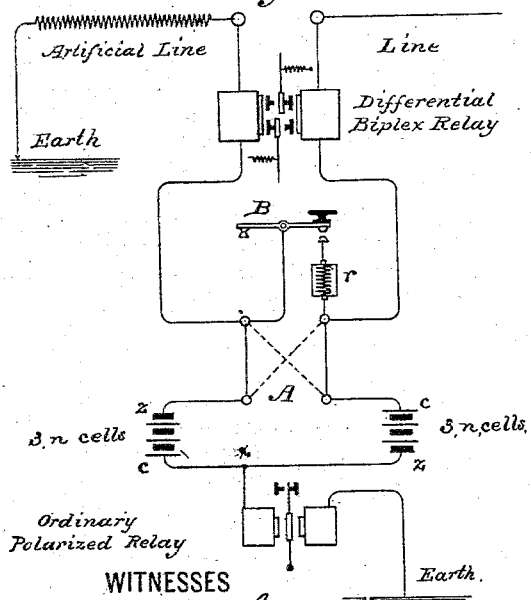
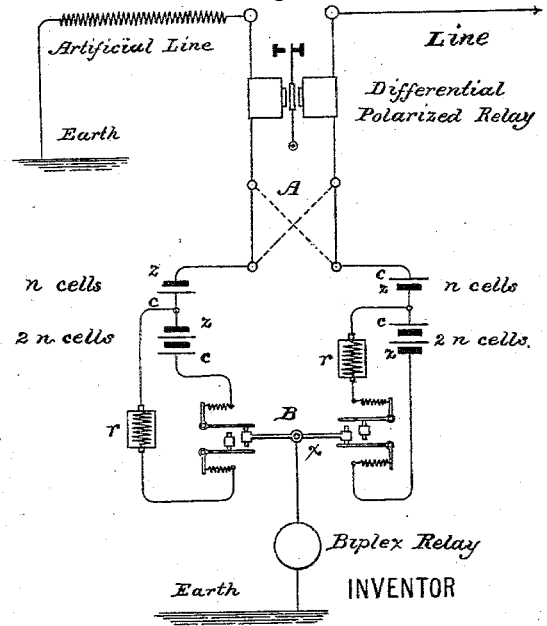
WITNESSES
Wm. A. Skinkle
H. W. Elmore
INVENTOR
Alexander Muirhead
By his Attorneys,
Baldwin, Hopkins & Peyton

UNITED STATES PATENT OFFICE.

ALEXANDER MUIRHEAD, OF LONDON, ENGLAND.

QUADRUPLEX TELEGRAPH.

SPECIFICATION forming part of Letters Patent No. 281,117, dated July 10, 1883.

Application filed November 24, 1882. (No model.)

*To all whom it may concern:*

Be it known that I, ALEXANDER MUIRHEAD, doing business at 3 Elm Court, Temple, E. C., London, England, and a resident at Oakwood, Farquhar Road, Upper Norwood, London, England, a subject of the Queen of Great Britain, have invented certain new and useful Improvements in Multiplex Telegraphy, of which the following is a specification.

In Letters Patent of the United States No. 227,039, granted to myself and George Kift Winter, a system of multiple telegraphy is shown, upon which my present invention constitutes an improvement. I do not wish, however, to be understood as limiting the present invention to the exact arrangement of batteries and lines described in that patent, nor to the specific details of the several organizations herein shown and described.

The invention consists in the use of split batteries of the general nature disclosed in said patent, and in the accompanying drawings, with main and artificial lines and relays, as will be hereinafter specifically set forth. Its objects are to decrease the amount of battery power required, to simplify the connections, and to improve the general working and capacity of the apparatus.

By the term "biplex relay" I wish to be understood as meaning a relay adapted to respond to the intermediate values of a series of four currents, whether such relay be a double-tongued relay similar to that disclosed in the patent hereinbefore referred to, or whether it be a non-polarized single-tongued relay.

Figures 1, 2, 3, and 4 are views respectively representing an organization at a single station, duplicate apparatus being of course provided at the distant station.

In Fig. 1 an arrangement of split battery on the double-substitution plan—such as is disclosed in the patent above referred to—is shown, in which two reversing-keys, A B, are employed. In this instance the biplex relay is differentially wound, and is placed between the main and artificial lines and between the sections of the battery, a coil of the differentially-wound relay being included in each of said lines. The ordinary polarized relay is placed between the middle, $x$, of the split battery and earth, as clearly shown in the drawings. In the prior patent referred to both relays are shown as placed between the middle of the battery and earth. I have found that by placing the relays in the manner shown in the drawings, and that by differentially winding one of them and placing it between the main and artificial lines and the sections of the battery, I very materially increase the practical efficiency of the organization and decrease the amount of battery-power required. Care should be taken that the resistance of the two coils of the differentially-wound relay should be equal. The effect of the currents in the main and artificial lines is to produce a state of equilibrium in the differentially-wound relay, which makes it very sensitive to changes in current strength in the main line. I am therefore, I find, enabled to use a less number of cells than is necessary in the system disclosed in the patent hereinbefore referred to. Under the organization shown in this figure the series of currents is $+3, +1, -1, -3$. The operation and organization of a biplex relay, either a biased double-tongued relay such as that disclosed in the patent referred to, or an ordinary non-polarized single-tongued tension-relay, which relays respond to changes in strength regardless of polarity, are well understood and need no description here. Any of the ordinary forms of such relays may be employed under my present invention—as, for instance, those in which the armatures are adjusted by tension-springs. By placing a relay between the main and artificial lines and between the sections of the split battery, I obtain very much improved results aside from the differential winding of such relay. By reversing the key A, the polarity of the entire battery, and consequently of the current on the line, will of course be reversed, so that the polarized relay at the distant station only will respond. By operating the key B, a portion only of the battery will be reversed, the effect of which is to change the strength of the current on the line without affecting its polarity, so that the biplex or unpolarized relay only at the distant station will respond. The operation of an organization of this character, including the main and artificial lines and split battery, is fully set forth in the patent before referred to, and further description is therefore unnecessary. With duplicate apparatus at two connected stations, quaduplex transmission may be practiced, as will be well understood.

In Fig. 2 a similar organization of batteries and relays is shown, except that in this instance the polarized relay is placed between the main and artificial lines of the sections of the battery, and is differentially wound, while the biplex relay is placed between the center of the split battery and the earth. The series of currents is the same, and the operation of the apparatus identical with that of Fig. 1.

In Fig. 3 the biplex relay is shown as differentially wound and placed between the main and artificial lines, the polarized relay being placed between the middle of the battery and earth. A modified arrangement of split battery is, however, shown, in which a single reversing or pole-changing key, A, is employed in connection with a transmitting-key, B. The key B is in a shunt-line which connects the poles of the battery, and contains a box of resistance-coils, $r$, equal, say, to one-half the internal resistance of the battery. When the key B is put down and the poles of the battery are connected through the resistance $r$, the potential of the battery and the current on the line will be reduced. By operating the key A, therefore, the polarity is reversed, and the polarized relay at the distant station responds, and by operating the key B the strength of the current on the line, regardless of its polarity, is changed so that the biplex relay responds. By such an arrangement the trouble of employing a second pole-changer or reversing-key is obviated and the connections are simplified.

In Fig. 4 the polarized relay is illustrated as differentially wound and placed between the main and artificial lines, the biplex relay being placed between the center of the battery and the earth. Under this organization a single reversing-key A is employed in connection with the transmitting-key B, which serves to change the strength of the current regardless of its polarity. A somewhat different arrangement of split battery is illustrated in this figure. With the key B in the normal condition, as shown in the drawings, the entire battery will be thrown upon the line; but with the key depressed 2n cells will be cut out on each side of the battery. In order, therefore, that the remaining cells of the battery may have a uniform value of current per cell on the line, I place resistances $r$ in each side of the battery equal to the internal resistance of the cells cut out by the depression of the key. The circuit of the remaining cells being completed through these resistances, their value per cell on the line will not be disturbed. Fig. 4 illustrates the complete organization of my invention as claimed.

From the foregoing it will appear that either the biplex relay or the polarized relay may be differentially wound and placed between the main and artificial lines and the sections of the battery, and the other relay placed between the middle of the battery and the earth. Where the biplex non-polarized or neutral relay is indicated in the drawings as placed between the main and artificial lines, it is shown as a double-tongued relay; but I do not confine myself to such a relay, as I have heretofore stated in the specification.

I claim as my invention—

1. The combination, substantially as set forth, of a main line, a constantly-closed artificial line, a split battery substantially such as described, and a relay placed between the main and artificial lines and between the sections of the battery.

2. The combination of a main line, a constantly-closed artificial line, a split battery substantially such as described, and a differentially-wound relay placed between the main and artificial lines and between the sections of the battery, as set forth.

3. The combination, substantially as set forth, of a main line, an artificial line, a split battery, a relay placed between the main and artificial lines and between the sections of the battery, a second relay between the battery and earth, and the keys A and B.

4. The combination of a main line, an artificial line, a split battery, a biplex relay, and a polarized relay, one of said relays being differentially wound and placed between the main and artificial lines and between the sections of the battery, and the other of said relays between the middle of the split battery and the earth.

5. The combination of the main line, artificial line, the split battery, the transmitting-key, by which a portion of the battery is cut out of the circuit, and a resistance equal to the internal resistance of the battery thus cut out, through which resistance the circuit of the remainder of the battery is completed, for the purpose set forth.

6. The combination, substantially as set forth, of a main line, an artificial line, the split battery, the relay placed between the main and artificial lines and between the sections of the split battery, another relay between the battery and earth, a battery-reversing key, and a key by which a portion of the battery is cut out of the circuit, and a resistance equal to the internal resistance of the battery thus cut out, through which resistance the circuit of the remainder of the battery is completed, for the purpose set forth.

In testimony whereof I have hereunto subscribed my name.

ALEXANDER MUIRHEAD.

Witnesses:
 DANIEL W. EDGECOMB,
 CHARLES A. TERRY.